United States Patent
Gupta et al.

(10) Patent No.: US 7,813,348 B1
(45) Date of Patent: Oct. 12, 2010

(54) METHODS, SYSTEMS, AND COMPUTER PROGRAM PRODUCTS FOR KILLING PRIORITIZED PACKETS USING TIME-TO-LIVE VALUES TO PREVENT HEAD-OF-LINE BLOCKING

(75) Inventors: Rajarshi Gupta, San Ramon, CA (US); Meera Siva, San Jose, CA (US); Ravi Tangirala, San Jose, CA (US); Alvin Chee, Sunnyvale, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1493 days.

(21) Appl. No.: 10/980,503

(22) Filed: Nov. 3, 2004

(51) Int. Cl.
*H04L 12/28* (2006.01)
(52) U.S. Cl. .................. 370/394; 370/412; 370/400
(58) Field of Classification Search ............... 370/394, 370/400, 412
See application file for complete search history.

(56) References Cited

U.S. PATENT DOCUMENTS

| | | | |
|---|---|---|---|
| 5,673,254 A | 9/1997 | Crayford | |
| 5,838,922 A | 11/1998 | Galand et al. | |
| 5,987,008 A | 11/1999 | Simpson et al. | |
| 6,002,675 A | 12/1999 | Ben-Michael et al. | |
| 6,026,075 A | 2/2000 | Linville et al. | |
| 6,091,709 A * | 7/2000 | Harrison et al. | 370/235 |
| 6,097,705 A | 8/2000 | Ben-Michael et al. | |
| 6,163,528 A | 12/2000 | Nagamoto | |
| 6,370,115 B1 | 4/2002 | Smith | |
| 6,442,170 B1 | 8/2002 | Perlman et al. | |
| 6,532,234 B1 | 3/2003 | Yoshikawa et al. | |
| 6,560,230 B1 * | 5/2003 | Li et al. | 370/395.42 |
| 6,614,756 B1 | 9/2003 | Morgenstern et al. | |
| RE38,309 E | 11/2003 | Frazier et al. | |
| 6,687,247 B1 * | 2/2004 | Wilford et al. | 370/392 |
| 6,687,254 B1 | 2/2004 | Ho et al. | |
| 6,721,273 B1 | 4/2004 | Lyon | |
| 6,760,309 B1 * | 7/2004 | Rochberger et al. | 370/235 |
| 6,771,601 B1 | 8/2004 | Aydemir et al. | |

(Continued)

OTHER PUBLICATIONS

Final Official Action for U.S. Appl. No. 11/052,380 (Dec. 3, 2009).

(Continued)

*Primary Examiner*—Jayanti K Patel
*Assistant Examiner*—Jung Park
(74) *Attorney, Agent, or Firm*—Jenkins, Wilson, Taylor & Hunt, P.A.

(57) ABSTRACT

Methods, systems, and computer program products for killing prioritized packets in multiple queues using time-to-live values to prevent head-of-line blocking. In one example, a method for scheduling prioritized packets in queuing system includes receiving a plurality of packets having a plurality of different priorities. The method can also include assigning the packets to the queues, wherein at least some of the queues include packets of a plurality of different priorities. In addition, the method can include assigning a first time-to-live (TTL) value to a first packet in a first queue. The method can also include altering the first TTL value of the first packet in response to a second packet of a second queue being scheduled. Further, the method can include discarding the first packet in response to the first TTL value having a predetermined relationship with respect to a predetermined value.

22 Claims, 3 Drawing Sheets

U.S. PATENT DOCUMENTS

| | | | |
|---|---|---|---|
| 6,813,274 B1 | 11/2004 | Suzuki et al. | |
| 6,859,435 B1 | 2/2005 | Lee et al. | |
| 6,987,732 B2 | 1/2006 | Gracon et al. | |
| 7,002,980 B1 | 2/2006 | Brewer et al. | |
| 7,023,841 B2 | 4/2006 | Dell et al. | |
| 7,023,857 B1 | 4/2006 | Chiussi et al. | |
| 7,042,883 B2 | 5/2006 | Fan et al. | |
| 7,068,602 B2 | 6/2006 | Davari et al. | |
| 7,088,710 B1 | 8/2006 | Johnson et al. | |
| 7,092,387 B2 | 8/2006 | Chen et al. | |
| 7,120,117 B1 | 10/2006 | Liu et al. | |
| 7,145,868 B2 | 12/2006 | Giroux et al. | |
| 7,151,744 B2 | 12/2006 | Sarkinen et al. | |
| 7,161,906 B2 | 1/2007 | Dell et al. | |
| 7,310,339 B1 * | 12/2007 | Powers et al. | 370/394 |
| 7,426,185 B1 | 9/2008 | Musacchio et al. | |
| 2001/0021174 A1 | 9/2001 | Luijten et al. | |
| 2001/0050913 A1 | 12/2001 | Chen et al. | |
| 2002/0110134 A1 | 8/2002 | Gracon et al. | |
| 2002/0122428 A1 | 9/2002 | Fan et al. | |
| 2002/0141427 A1 | 10/2002 | McAlpine | |
| 2003/0021230 A1 | 1/2003 | Kuo et al. | |
| 2003/0099193 A1 | 5/2003 | Liu et al. | |
| 2003/0119556 A1 * | 6/2003 | Khan et al. | 455/560 |
| 2003/0174652 A1 * | 9/2003 | Ebata | 370/235 |
| 2004/0196859 A1 | 10/2004 | Benner | |
| 2005/0094645 A1 * | 5/2005 | Sridhar et al. | 370/395.42 |
| 2005/0175014 A1 | 8/2005 | Patrick | |
| 2006/0039374 A1 | 2/2006 | Belz et al. | |
| 2006/0092837 A1 | 5/2006 | Kwan et al. | |
| 2006/0101140 A1 | 5/2006 | Gai et al. | |
| 2006/0120286 A1 | 6/2006 | Fan et al. | |
| 2006/0164979 A1 | 7/2006 | Pirbhai et al. | |
| 2006/0164989 A1 | 7/2006 | Hart et al. | |
| 2006/0251067 A1 | 11/2006 | DeSanti et al. | |
| 2007/0183421 A1 | 8/2007 | Terrell et al. | |
| 2007/0189283 A1 | 8/2007 | Agarwal et al. | |
| 2007/0237074 A1 | 10/2007 | Curry | |

OTHER PUBLICATIONS

Interview Summary for U.S. Appl. No. 11/052,380 (Sep. 8, 2009).
Official Action for U.S. Appl. No. 11/052,380 (Mar. 13, 2009).
Final Office Action for U.S. Appl. No. 11/052,380 (Aug. 20, 2008).
Official Action for U.S. Appl. No. 11/052,380 (Feb. 6, 2008).

* cited by examiner

METHODS, SYSTEMS, AND COMPUTER PROGRAM PRODUCTS FOR KILLING PRIORITIZED PACKETS USING TIME-TO-LIVE VALUES TO PREVENT HEAD-OF-LINE BLOCKING

TECHNICAL FIELD

The subject matter disclosed herein relates to queue scheduling. More particularly, the subject matter disclosed herein relates to methods and systems for scheduling prioritized packets in multiple queues using time-to-live values and packet killing to prevent head-of-line blocking.

BACKGROUND ART

Network switches, routers, and various other network devices typically include a plurality of queues for storing packets received in a network environment. The packets can be maintained in the queues in a received order and scheduled for forwarding to other network devices or removal for other network processes. Each packet may have an associated priority, and each queue may have packets with different priorities. A scheduler may schedule packets for dequeuing based on their relative priorities. For example, the scheduler may examine the head-of-line packet in each of the queues and schedule the packet with the highest priority.

One problem with such a queuing system is head-of-line blocking. Head-of-line blocking may occur when a low priority packet present at the head of one of the queues blocks higher-priority packets behind it in the same queue. When this occurs, higher priority packets at the head of other queues will be scheduled before the low priority packet and thus removed from the other queues. The high priority packets removed from the other queues may be replaced with other high priority packets. In this case, the low priority packet may not be scheduled for a long time because the other higher priority packets from other queues are being serviced and the lower priority is bypassed for service. Thus, the low priority packet may block the high priority packets behind it. These high priority packets may have been scheduled if it were not for the low priority packet at the head of the queue. The blocking of high priority packets is undesirable in many applications.

Several techniques have been developed for managing head-of-line blocking. For example, one technique includes assigning a virtual queue to each packet priority and servicing the packets from the highest priority virtual queue first. Lower priority virtual queues are serviced after all of the packets in the higher priority queues have been serviced. Thus, a lower priority packet is prevented from blocking a higher priority packet. One problem with this technique is that a single stream may have packets belonging to multiple priorities. Therefore, a higher priority packet may be serviced out of order from an earlier-received low priority packet in the same stream because they use different queues. Therefore, packet re-ordering may result. Packet re-ordering is undesirable in many higher layer applications.

Accordingly, there exists a need for methods, systems, and computer program products for scheduling prioritized packets in multiple queues in an efficient manner and that prevents head-of-line blocking and that services packets belonging to the same stream in a first-in first-out (FIFO) manner.

SUMMARY

According to one aspect, the subject matter described herein comprises methods, systems, and computer program products for scheduling prioritized packets in queuing system includes receiving a plurality of packets having a plurality of different priorities. A method according to one embodiment can include a step for assigning the packets to the queues, wherein at least some of the queues include packets of a plurality of different priorities. In addition, the method can include a step for assigning a first time-to-live (TTL) value to a first packet in a first queue. The method can also include a step for altering the first TTL value of the first packet in response to a second packet of a second queue being scheduled. Further, the method can include a step for discarding the first packet in response to the first TTL value having a predetermined relationship with respect to a predetermined value.

BRIEF DESCRIPTION OF THE DRAWINGS

Preferred embodiments of the subject matter described herein will now be explained with reference to the accompanying drawings of which.

DETAILED DESCRIPTION

Methods and systems for scheduling prioritized packets in multiple queues may be implemented in any suitable device including a packet queuing system. Such devices may include a network device such as a layer 3 forwarding device or IP router. The subject matter described herein can prevent head-of-line blocking in queuing systems having multiple queues with packets of multiple priorities. According to one embodiment, the subject matter described herein can time the removal or killing of low priority, head-of-line packets in order to prevent blocking of higher priority packets in the queue.

Figure 1:
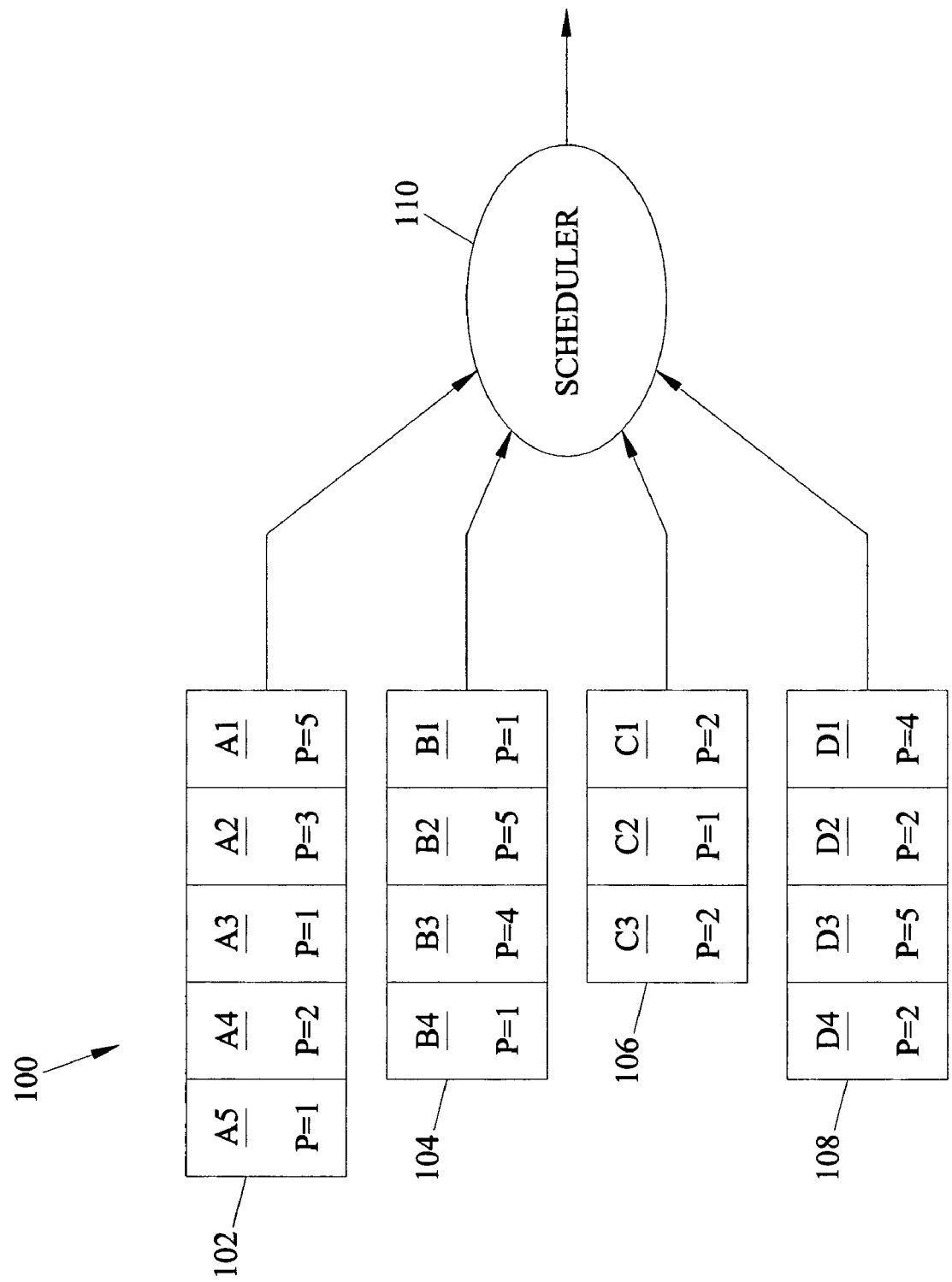
FIG. 1 is an exemplary packet queuing system for scheduling prioritized packets in multiple queues.

FIG. 1 illustrates an exemplary packet queuing system, generally designated 100, for scheduling prioritized packets in multiple queues according to one embodiment. Referring to FIG. 1, system 100 comprises a plurality of queues 102, 104, 106, and 108 and a scheduler 110. Queues 102, 104, 106, and 108 can receive and maintain packets until removed by scheduler 110 for further processing. Queues 102, 104, 106, and 108 can include a number of packets for retrieval by scheduler 110. In the example of FIG. 1, queue 102 includes packets A1-A5, queue 104 includes packets B1-B4, queue 106 includes packets C1-C3, and queue 108 includes packets D1-D4. Queues 102, 104, 106, and 108 can maintain any suitable number of packets.

Each queue 102, 104, 106, and 108 may operate in a first-in first-out (FIFO) fashion, wherein scheduler 110 first retrieves the earliest received packets in each of queues 102, 104, 106, and 108 and then the most recently received packets. For example, referring to FIG. 1, packets A1, B1, C1, and D1 are the earliest received packets in queues 102, 104, 106, and 108, respectively, and may be the packets that are removed first. Further, the packets shown in each queue are assumed to be ordered according to time of receipt. A head-of-line packet (i.e., packets A1, B1, C1, and D1) refers to the first packet to be removed by scheduler 110 in the packet's queue.

Each queue may contain packets that are part of the same communications stream. For example, packets A1-A5 may be part of a first stream, B1-B4 may be part of a second stream, C1-C3 may be part of the third stream, and D1-D4 may be part of a fourth stream. As discussed above, it is desirable that the order of packets of the same stream be preserved. The methods and systems described herein preserve such ordering while preventing head-of-line blocking.

As stated above, scheduler 110 can select or schedule one of head-of-line packets A1, B1, C1, and D1 for further processing. The selected packet can then be removed from its queue and the other packets in the queue moved up. For example, if scheduler 110 selects packet B1 and removes it from queue 104, packets B2 becomes the new head-of-line packet and packets B3 and B4 move up in the same order behind packet B2.

Packets can each have an associated priority. For example, referring to FIG. 1, each packet may have a priority ranging from 1 to 5 with 1 being the highest priority and 5 being the lowest priority. Scheduler 110 can select the head-of-line packet with the highest priority as the next packet for processing. For example, scheduler 110 will select packet B1 from among all the head-of-line packets because it has the highest priority (i.e., priority 1) among the packets. The highest priority packet is selected by scheduler 110 because these packets may require more urgent processing than other lower priority packets.

According to one feature of the methods and systems described herein, scheduler 110 can also assign a time-to-live (TTL) value to each head-of-line packet A1, B1, C1, and D1 in order to prevent head-of-line blocking. The TTL value can represent a number of time slots that the head-of-line packet will live before it is removed from its queue or killed. Each time a packet from another queue is scheduled, the TTL value may be decremented. When the TTL value reached zero, the packet is killed or discarded. If the packet is killed, the other packets in the queue move up and a new packet becomes the head-of-line packet. Thus, the head-of-line packet is prevented from blocking the next packet in the queue for a time longer than its TTL value. The head-of-line packet may also be removed or scheduled for processing prior to being killed based on its TTL value. The TTL value is assigned when the packet is moved to the head of the queue.

The TTL value assigned to the head-of-line packet can be based upon the priority assigned to the packet. A packet with a higher priority can be assigned a higher TTL value than a lower priority packet such that the time before removing or killing the packet is longer than the time allowed for a lower priority packet. In one implementation, a head-of-line packet with the highest priority can be assigned a TTL value of infinity so that it will never be removed or deleted. A low priority packet, such as a packet with priority 5, can be assigned a TTL value of 1 or any other suitable low value.

In one refinement of the methods and systems described herein, a packet at the head of a queue may be discarded when its time-to-live value reaches zero only if it is blocking higher priority packets. For example, when the time-to-live value of the packet at the head of a queue reaches zero, packets following that packet may be analyzed. If the priorities of the packets following the packet at the head of the queue are lower than that of the packet at the head of the queue, then the packet at the head of the queue is preferably not discarded. Similarly, if there are no packets following the packet at the head of queue, the packet is preferably not discarded. If there is a higher priority packet following the packet at the head of the queue, the packet is preferably discarded.

In another refinement of the methods and systems described herein, multiple low priority packets may be discarded when the time-to-live value for the packet at the head of the queue expires. For example, if there are N low priority packets at the front of the queue blocking a high priority packet, it would take N times TTL time for the high priority packet to be scheduled. In order to improve service of the high priority packet, multiple packets may be simultaneously killed or discarded when the time-to-live value for the packet at the head of the queue expires. In one implementation, all consecutive packets from the head of a queue until a packet of higher priority than the packet at the head of the queue may be discarded. The packet of higher priority may then be moved to the head of the queue.

In another implementation, every packet from the head of the queue until a packet of the highest priority in the queue may be discarded. This refinement would allow the highest priority packet to cast aside all other packets of lower priority before it in the queue. Such a multiple packet kill scheme will ensure bounded latency of high priority packets. No packet would block the head of the queue longer than the sum of the time to live and the queue depth. For the case where only one packet is dropped or killed when the TTL value for the packet at the head of the queue expires, the latency experienced by high priority packets is a function of the product of the queue depth and the average TTL value of all packets in front of the high priority packet in the queue. Thus, killing multiple packets in response to expiration of the TTL value of the packet at the head of the queue can greatly reduce latency experienced by a high priority packet.

Queuing system 100 can be implemented in a network device including hardware and software for implementing packet delivery. The network device can include an IP router for forwarding network level datagrams to their intended destinations. The network device may be implemented on any suitable underlying layer 1 and 2 platform, such as an Ethernet switch. An exemplary Ethernet switch including an underlying hardware platform suitable for use with embodiments described herein is the BLACKDIAMOND™ Ethernet switch or any of the other Ethernet switches available from Extreme Networks, Inc. of Santa Clara, Calif. Queuing system 100 can be implemented in the network device with any suitable combination of software, hardware, and/or firmware.

Figure 2:
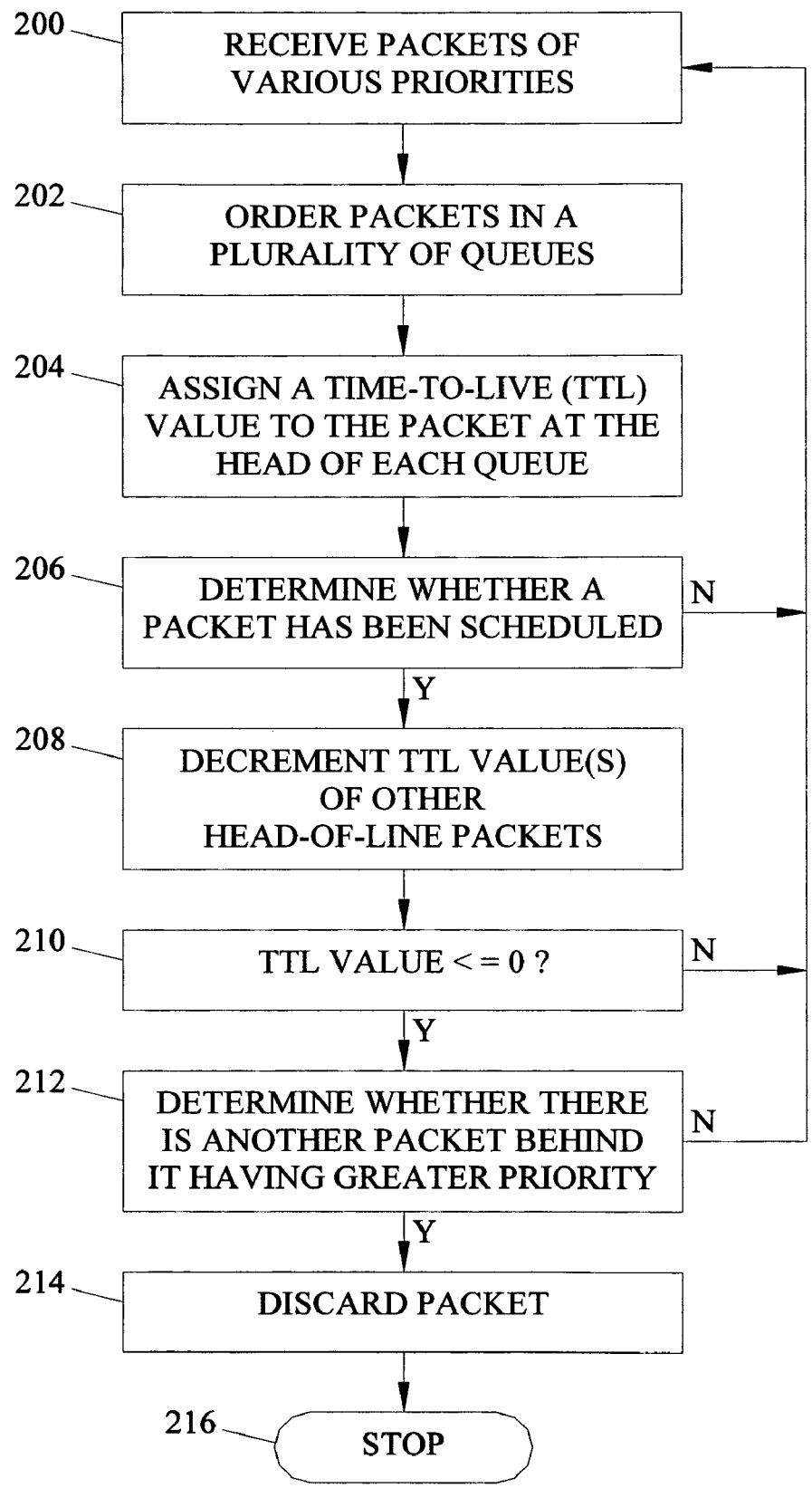
FIG. 2 is a flow chart illustrating an exemplary process for scheduling prioritized packets in multiple queues using TTL values and Packet killing to prevent head-to-live blocking according to the methods and systems described herein.

FIG. 2 is a flow chart illustrating an exemplary process for scheduling prioritized packets in multiple queues using TTL values and Packet killing to prevent head-to-live blocking according to the methods and systems described herein. Referring to FIG. 2, the process can begin at step 200 when packets (e.g., packets A1-A5, B1-B4, C1-C3, and D1-D4 shown in FIG. 1) of various priorities are received by system 100. Next, at step 202 of FIG. 2, the packets can be ordered in queues (e.g., queues 102, 104, 106, and 108 shown in FIG. 1) in the sequence in which the packets are received. For example, queues 102, 104, 106, and 108 may be associated with different input ports or different output ports associated with the switch. As a result, each queue may include packets associated with the same stream that are preferably not reordered by the switch. Accordingly, it is desirable to prevent head-of-line blocking without reordering the packets in any individual queue.

Referring to step 204 of FIG. 2, a time-to-live (TTL) value may be assigned to the packet at the head of each queue. According to one embodiment, the TTL value for each packet is based on the packet's priority. The TTL value determines the amount of time a packet will remain in its queue before it is discarded or killed. As stated above, the TTL value for a highest priority packet may be set to infinity such that it will never be discarded. The TTL value can be configured to different values.

At step 206, it can be determined whether a head-of-line packet in one of the queues has been scheduled for delivery or processing. If a packet has not been scheduled, the process can continue receiving and ordering packets in the queues in steps 200, 202, and 204. Otherwise, if a head-of-line packet has been scheduled, the TTL value of every other head-of-line packet is decremented (step 208). Next, it can be determined whether the new TTL value for any of the head-of-line packets is less than or equal to 0 (step 210). If the TTL value of the other packets is not less than or equal to zero, the process returns to step 200. If the TTL value is less than or equal to zero, the process proceeds to step 212.

Referring to step 212, it can be determined whether there is another packet having greater priority behind the head-of-line packet. If there is not another packet having greater priority, the process can return to step 200. Otherwise, if there is another packet having greater priority, the packet at the head of the queue can be discarded or killed (step 214). The process can then stop at step 216. Thus, the problem of head-of-line packet blocking other packets in the queue is alleviated such that a single packet can only block the other packets in the queue for at most its TTL value.

As described above, a head-of-line packet can be removed without steps 212 if the packet is determined to have a TTL value less than or equal to 0 at step 210. That is, a packet may be discarded without checking the priorities of packets behind it in the queue. Such an implementation is less efficient than an implementation that checks for the existence of higher priority packets being blocked because failing to check may result in packets being unnecessarily discarded.

Figure 3:
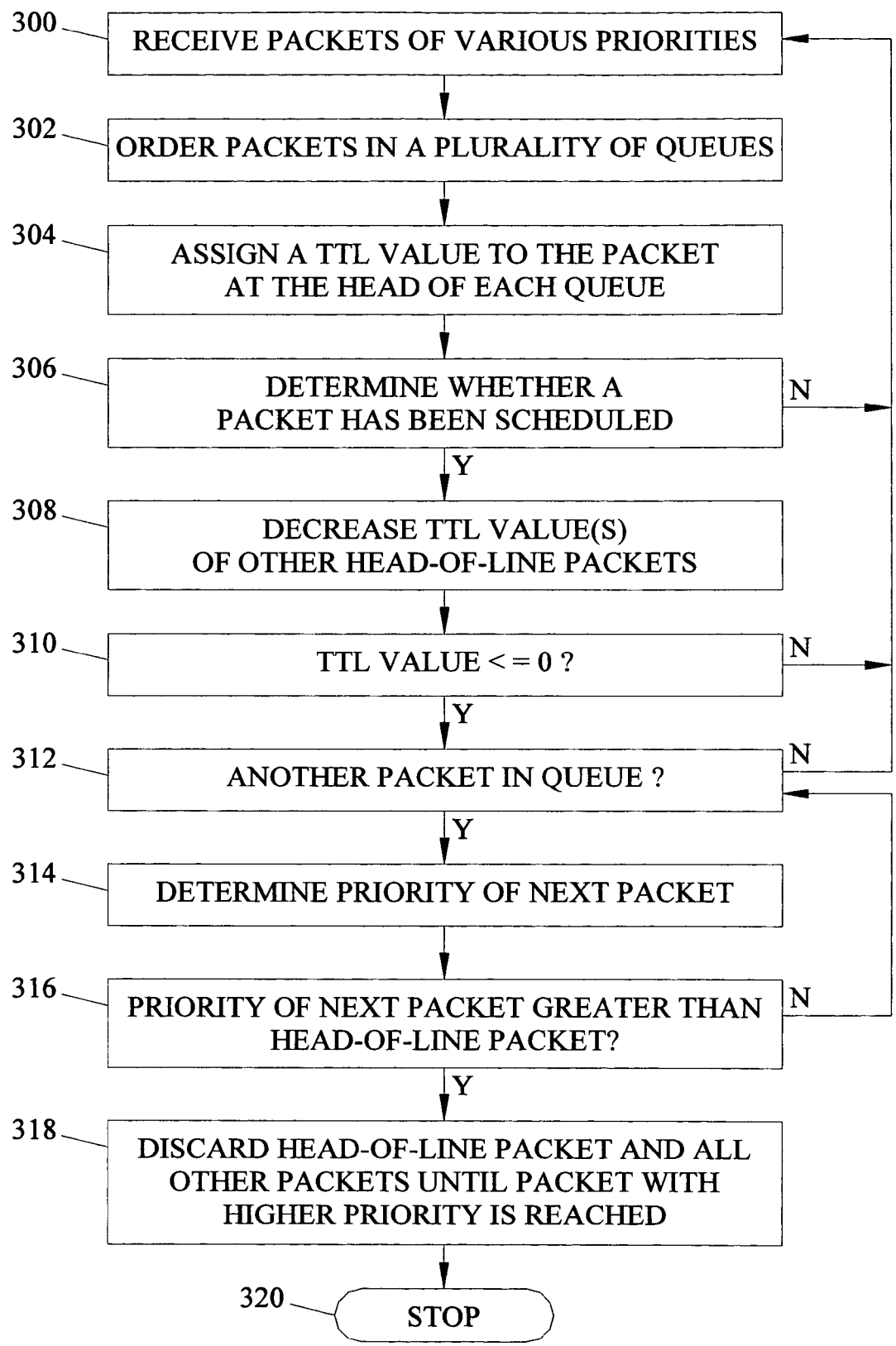
FIG. 3 is a flow chart illustrating an exemplary process for scheduling prioritized packets in multiple queues by removing or killing multiple packets ahead of a high priority packet.

As described above, multiple packets can be discarded or killed to hasten the delivery of a high priority packet. FIG. 3 is a flow chart illustrating an exemplary process for scheduling prioritized packets in multiple queues by removing or killing multiple packets ahead of a high priority packet. Referring to FIG. 3, the process can begin at step 300 when packets (e.g., packets A1-A5, B1-B4, C1-C3, and D1-D4 shown in FIG. 1) of various priorities are received by system 100. Next, at step 302, the packets can be ordered in queues (e.g., queues 102, 104, 106, and 108 shown in FIG. 1) in the sequence in which the packets are received.

Referring to step 304 of FIG. 3, a TTL value may be assigned to the head-of-line packet of each queue. The TTL value can be based on the priority of the associated head-of-line packet. Next, at step 306, it can be determined whether a packet in one of the queues has been scheduled for delivery or processing. If a packet has not been scheduled, the process can continue with steps 300, 302, and 304. Otherwise, if a packet has been scheduled, the TTL value of every other head-of-line packet is decreased (step 308). Next, it can be determined whether the TTL value for any of the packets is less than or equal to 0 (step 310). If the TTL value is not less than or equal to zero, the process returns to step 300. If the TTL value is less than or equal to zero, the process proceeds to step 312.

At step 312 of FIG. 3, it can be determined whether there is another packet in the queue. If there is not another packet in the queue, the process can return to step 300. Otherwise, the process proceeds to step 314.

Referring to step 314 of FIG. 3, the priority of the packet following the head-of-line packet in the queue can be determined. Next, at step 316, the priorities of the next packet and the head-of-line packet can be compared to determine if the priority of the next packet is greater than the priority of the head-of-line packet. If the priority of the next packet is not greater, the process returns to step 312 to determine whether there is another packet in the queue. If there is another packet in the queue, the next packet and the head-of-line packet can be compared to determine if the priority of that packet is greater than the priority of the head-of-line packet (step 316). The process can continue through steps 312 and 316 until a packet is found in the queue with a priority greater than the priority of the head-of-line packet. When a packet is determined to have a priority greater than the head-of-line packet, the process can proceed to step 318.

Referring to step 318 of FIG. 3, the head-of-line packet and all of the consecutive packets in the queue up until the packet which has a higher priority than the head-of-line packet may be discarded. The packet with the higher priority remains in the queue and is now the head-of-line packet for the queue. The process can then stop at step 320. Thus, in this implementation, all lower priority packets can only block higher priority packets in the queue for at most the TTL value. As discussed above, steps 314 to 318 may be modified so that all packets up until a packet of a highest or other predetermined priority is reached so that packets of a certain priority have a queuing delay that is bounded only by the TTL and the queue depth.

Thus, as described above, the subject matter described herein includes methods, systems, and computer program products for scheduling prioritized packets in a queue. According to the method, a first time-to-live value is assigned to a first packet in a first queue. The first time-to-live value of the first packet can be decremented when a second packet of a second queue is scheduled (i.e., when a different packet belonging to another queue is scheduled). In addition, the first packet can be discarded when the first time-to-live value is equal to or less than a predetermined value. As a result, low priority packet at the head of a queue can be prevented from blocking packets behind the low priority packet, particularly higher priority packets.

Although the examples described above relate primarily to assigning a time-to-live value to the packet at the head of a queue and decrementing the time-to-live value, the present invention is not limited to these examples. For example, in an alternate implementation, the time-to-live value may be additionally set to zero or other suitable value based on priority and may be incremented each time a packet in another queue is scheduled. When the time-to-live value reaches or exceeds a predetermined maximum value, the head-of-line packet may be discarded.

Alternative to decrementing or incrementing by 1, the time-to-live value may be decremented or incremented by a predetermined value based on priority. For example, a low priority packet may decrement (or increment) by a number greater than 1 and a high priority packet may decrement (increment) by less.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for scheduling prioritized packets in queuing system having a plurality of queues, the method comprising:

(a) receiving a plurality of packets having a plurality of different priorities;

(b) assigning the packets to the queues, wherein at least some of the queues include packets of a plurality of different priorities;
(c) assigning a first time-to-live (TTL) value to a first packet in a first queue;
(d) altering the first TTL value of the first packet in response to a second packet of a second queue being scheduled; and
(e) discarding the first packet in response to the first TTL value having a predetermined relationship with respect to a predetermined value.

2. The method of claim 1 wherein receiving a plurality of packets includes receiving packets associated with the plurality of different streams and where assigning the packets to the queues includes assigning packets associated with the same stream to the same queue.

3. The method of claim 1 wherein assigning the packets to the queues includes arranging the packets in each queue in an order based on time of receipt of each packet.

4. The method of claim 1 wherein the first packet is a head-of-line packet in the first queue.

5. The method of claim 1 wherein the first packet is associated with a first priority of the plurality of priorities.

6. The method of claim 5 wherein assigning a TTL value includes assigning the TTL value based on the first priority associated with the first packet.

7. The method of claim 5 wherein assigning a TTL value includes assigning a TTL value of infinity in response to the first priority being a highest priority of the plurality of priorities.

8. The method of claim 1 comprising, in response to the TTL value having the predetermined relationship with respect to the predetermined value, discarding packets in the first queue behind the first packet having priorities less than or equal to a predetermined priority value.

9. The method of claim 8 wherein the predetermined priority value comprises a priority value assigned to the first packet.

10. The method of claim 8 wherein the predetermined priority value comprises a highest priority value amount packets in the first queue.

11. The method of claim 1 wherein discarding the first packet includes discarding the first packet only in response to determining that the first packet is blocking one or more packets having a higher priority than that of the first packet.

12. A queuing system for scheduling prioritized packets in a plurality of queues, the system comprising:
(a) first and second queues, the first queue including a first packet and the second queue including a second packet; and
(b) a scheduler for altering a first time-to-live (TTL) value of the first packet in response to scheduling of the second packet, and for discarding the first packet in response to the first TTL value having a predetermined relationship with respect to a first predetermined value.

13. The system of claim 12 wherein the first and second queues each include a plurality of packets having different priorities and wherein the packets of in the first queue are associated with the first stream and the packets in the second queue are associated with the second stream.

14. The system of claim 13 wherein the packets in each queue are ordered based on time of receipt.

15. The system of claim 12 wherein the first packet in the first queue is a head-of-line packet in the first queue.

16. The system of claim 12 wherein the first packet in the first queue is associated with a first priority of the plurality of priorities.

17. The system of claim 16 wherein the TTL value is based on the first priority.

18. The system of claim 16 wherein the first TTL value is set to infinity in response to the first priority being a highest priority of the plurality of priorities.

19. The system of claim 12 wherein, in response to the TTL value having the predetermined relationship with respect to the predetermined value, the scheduler is operable to remove one or more packets in the first queue behind the first packet in response to priorities of the one or more packets being less than or equal to a predetermined priority value.

20. The system of claim 19 wherein the predetermined priority value is less than a highest priority of the plurality of priorities.

21. The system of claim 19 wherein the predetermined priority value includes a priority assigned to the first packet.

22. The system of claim 12 wherein the scheduler is operable to discard the first packet only in response to determining that the first packet blocks one or more packets in the first queue having priorities higher than a priority assigned to the first packet.

* * * * *